(12) United States Patent
Hsieh et al.

(10) Patent No.: US 8,373,937 B2
(45) Date of Patent: Feb. 12, 2013

(54) MINIATURIZED OPTICAL LENS SYSTEM

(75) Inventors: Dung-Yi Hsieh, Taichung (TW);
Tsung-Han Tsai, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 89 days.

(21) Appl. No.: 13/041,432

(22) Filed: Mar. 6, 2011

(65) Prior Publication Data
US 2012/0224272 A1 Sep. 6, 2012

(51) Int. Cl.
*G02B 3/02* (2006.01)
*G02B 9/04* (2006.01)
(52) U.S. Cl. .................................. 359/717; 359/795
(58) Field of Classification Search .......... 359/708–717, 359/754–758, 763–766, 771–775, 784–785, 359/793, 795
See application file for complete search history.

(56) References Cited

U.S. PATENT DOCUMENTS 7,436,604 B1 * 10/2008 Tang ............................. 359/717
7,948,689 B2    5/2011 Fukuta et al.

* cited by examiner

*Primary Examiner* — Darryl J Collins

(57) ABSTRACT

A miniaturized optical lens system comprises, in order from the object side to the image side: a first lens element with positive refractive power having a convex object-side surface, a concave image-side surface and one of the surfaces being aspheric; and a second lens element with negative refractive power having a concave object-side surface, a convex image-side surface and one of the surfaces being aspheric. The optical lens system is further provided with an aperture stop. Such arrangements can effectively reduce the volume of the optical lens system, correct aberrations and astigmatism of the system in order to obtain higher image quality.

20 Claims, 12 Drawing Sheets

MINIATURIZED OPTICAL LENS SYSTEM

BACKGROUND OF THE INVENTION

1. Field of the Invention

The present invention relates to an optical lens system, and more particularly to a miniaturized optical lens system used in electronics.

2. Description of the Prior Art

In recent years, since the optical lens system has become smaller in size, and due to advances in semiconductor manufacturing, the electronic sensor of a conventional digital camera is typically a CCD (Charge Coupled Device) or CMOS (Complementary Metal Oxide Semiconductor) sensor, the pixel size of sensors has been reduced gradually, and miniaturization has become the trend of modern electronic products. Therefore, the miniaturized optical lens system with good image quality is still the trend of the mainstream market.

In order to correct aberrations, conventional miniaturized lens systems mostly consist of three lens elements, and one of the typical structures is the positive-negative-positive Triplet type. However, when the size of the lens assembly is reduced substantially, less space is available for constructing the optical system, making it difficult to incorporate three lens elements into the optical system. Furthermore, the lens elements must become thinner, causing poor homogeneity of the plastic material within the lens elements manufactured by injection molding process.

Hence, only the optical lens system with two lens elements is feasible in order to effectively reduce the total track length of the optical lens system. Additionally, in order to correct aberrations, the aperture stop is normally located in the front of the optical system. However, the second lens element of this optical lens system is biconcave, which performs poorly than a meniscus lens element in terms of aberration and astigmatism corrections.

Therefore, the present invention is aimed at providing an easy-to-manufacture miniaturized optical lens system which can effectively reduce the total track length of the optical lens system and provide great image quality.

The present invention mitigates and/or obviates the aforementioned disadvantages.

SUMMARY OF THE INVENTION

The primary objective of the present invention is to provide a miniaturized optical lens system comprising two lens elements to effectively reduce the volume of the optical lens system, correct aberrations and astigmatism of the system and provide higher resolution.

A miniaturized optical lens system in accordance with the present invention comprises, in order from the object side to the image side: a first lens element with positive refractive power having a convex object-side surface and a concave image-side surface, at least one of the object-side and the image-side surfaces of the first lens element being aspheric; a second lens element with negative refractive power having a concave object-side surface and a convex image-side surface, at least one of the object-side and the image-side surfaces of the second lens element being aspheric. In the miniaturized optical lens system, there are two lens elements with refractive power. The Abbe number of the first lens element is V1, the Abbe number of the second lens element is V2, the focal length of the miniaturized optical lens system is f, the focal length of the second lens element is f2, and the radius of curvature of the object-side surface of the second lens element is R3. The optical lens system is further provided with an aperture stop, the distance from the aperture stop to the image plane along an optical axis is SL, the distance from the object-side surface of the first lens element to the image plane along the optical axis is TTL, and they satisfy the relations: $15<|V1-V2|<48$; $-0.43<f/f2<0$; $-1.50<R3/f<-0.40$; $0.9<SL/TTL<1.1$. Such arrangements can effectively reduce the volume of the system, correct aberrations as well as astigmatism of the system, and obtain high resolution.

The first lens element with positive refractive power can provide partial refractive power for the miniaturized optical lens system, and reduce the total track length of the optical lens system.

The second lens element with negative refractive power can effectively correct aberrations of the miniaturized optical lens system, and improve the image quality.

The first lens element has a convex object-side surface and a concave image-side surface, which will be favorable to correct astigmatism of the system.

The second lens element has a concave object-side surface and a convex image-side surface, which will be favorable to correct the high order aberrations of the system.

If $15<|V1-V2|<48$ is satisfied, it will be favorable to correct the chromatic aberration within the system. Preferably, V1 and V2 satisfy the relation:

$$23<|V1-V2|<45,$$

Furthermore, V1 and V2 can satisfy the relation:

$$30<|V1-V2|<42.$$

If $-0.43<f/f2<0$ is satisfied, the refractive power of the second lens element can effectively correct aberrations of the system. Preferably, f/f2 satisfies the relation:

$$-0.27<f/f2<0.$$

If $-1.50<R3/f<-0.40$ is satisfied, the second lens element can effectively correct the astigmatism. Preferably, R3/f satisfies the relation:

$$-1.20<R3/f<-0.50.$$

If $0.9<SL/TTL<1.1$ is satisfied, the miniaturized optical lens system can utilize the telecentric feature to reduce the total track length of the optical system.

According to one aspect of the present miniaturized optical lens system, the radius of curvature of the object-side surface of the first lens element is R1, and the radius of curvature of the image-side surface of the first lens element is R2. If R1/R2 satisfies the relation: $0<R1/R2<0.8$, it can effectively correct the spherical aberration within the system. Preferably, R1/R2 satisfies the relation:

$$0.40<R1/R2<0.60.$$

According to another aspect of the present miniaturized optical lens system, the center thickness of the first lens element is CT1, and the center thickness of the second lens element is CT2. If CT1/CT2 satisfies the relation: $0.25<CT1/CT2<0.95$, the thickness of the first lens element and the second lens element can reduce the difficulties in manufacturing and assembling processes. Preferably, CT1/CT2 satisfies the relation:

$$0.40 < CT1/CT2 < 0.76.$$

According to another aspect of the present miniaturized optical lens system, the refractive index of the first lens element is N1, and the refractive index of the second lens element is N2. If N1 and N2 satisfy the relation: N2>N1, the refractive index of the first lens element and the second lens element can reduce the total track length of the system and maintain superior image quality. Preferably, N1 and N2 satisfy the relation:

$$0.04 < N2 - N1 < 0.18.$$

According to another aspect of the present miniaturized optical lens system, the distance from the image-side surface of the second lens element to the image plane along the optical axis is Bf, and the center thickness of the second lens element is CT2. If Bf/CT2 satisfies the relation: 0.4<Bf/CT2<2.0, there will be enough space between the second lens element and the electronic sensor for other components. Preferably, Bf/CT2 satisfies the relation:

$$0.95 < Bf/CT2 < 1.65.$$

According to another aspect of the present miniaturized optical lens system, the distance from the object-side surface of the first lens element to the image plane along the optical axis is TTL, an electronic sensor is provided on the image plane, and half of the diagonal length of the electronic sensor's effective pixel region is ImgH. If TTL/ImgH satisfies the relation: TTL/ImgH<1.95, the optical lens system will be favorable to stay compact, which allows the lens system to be used in the portable electronics.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
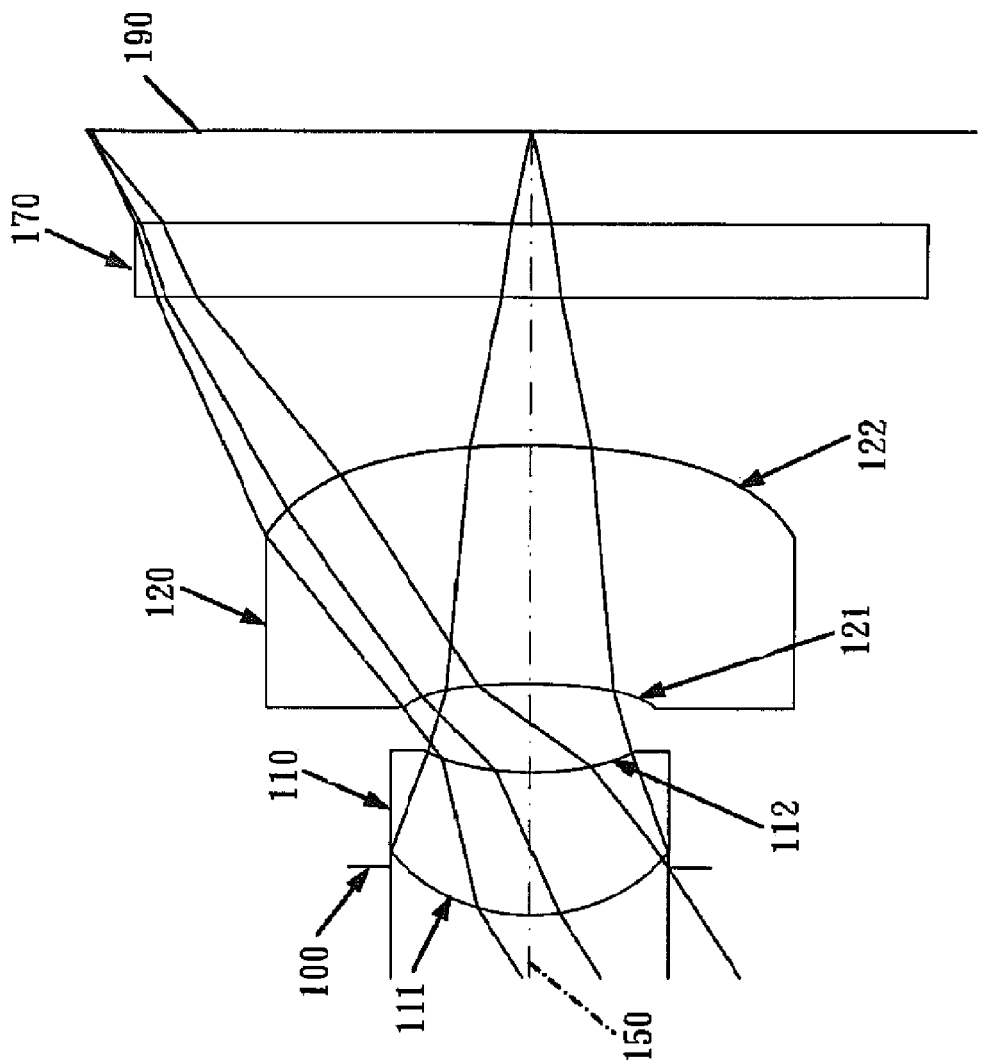
FIG. 1A shows an optical lens system in accordance with a first embodiment of the present invention.
Figure 1B:
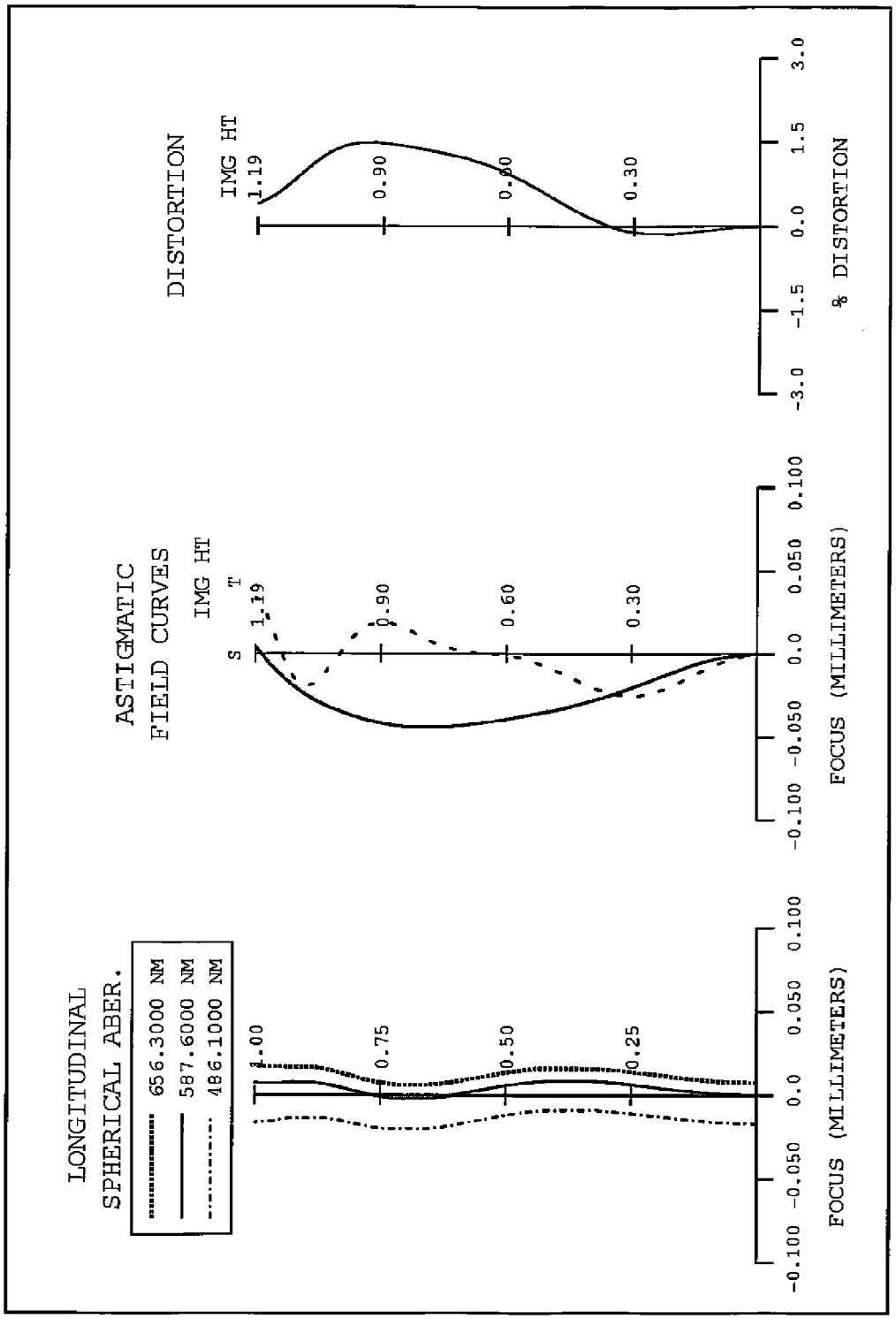
FIG. 1B shows the longitudinal spherical aberration curves, the astigmatic field curves, and the distortion curve of the first embodiment of the present invention.

Referring to FIG. 1A, which shows a miniaturized optical lens system in accordance with a first embodiment of the present invention, and FIG. 1B shows the longitudinal spherical aberration curves, the astigmatic field curves, and the distortion curve of the first embodiment of the present invention. A miniaturized optical lens system in accordance with the first embodiment of the present invention comprises, in order from the object side to the image side:

A plastic first lens element 110 with positive refractive power has a convex object-side surface 111 and a concave image-side surface 112, and the object-side surface 111 and the image-side surface 112 of the first lens element 110 are aspheric.

A plastic second lens element 120 with negative refractive power has a concave object-side surface 121 and a convex image-side surface 122, and the object-side surface 121 and the image-side surface 122 of the second lens element 120 are aspheric.

An aperture stop 100 is located between an object to be photographed (not shown) and the first lens element 110.

An IR cut filter 170 which is made of glass is located between the image-side surface 122 of the second lens element 120 and an image plane 190 and has no influence on the focal length of the optical lens system.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis, k: the conic coefficient;

Ai: the aspheric surface coefficient of order i.

In the first embodiment of the present optical lens system, the focal length of the miniaturized optical lens system is f, and it satisfies the relation:

$$f=1.84.$$

In the first embodiment of the present optical lens system, the f-number of the miniaturized optical lens system is Fno, and it satisfies the relation:

$$Fno=2.45.$$

In the first embodiment of the present optical lens system, half of the maximal field of view is HFOV, and it satisfies the relation:

$$HFOV=33.0.$$

In the first embodiment of the present optical lens system, the Abbe number of the first lens element 110 is V1, the Abbe number of the second lens element 120 is V2, and they satisfy the relation:

$$|V1-V2|=32.5.$$

In the first embodiment of the present optical lens system, the refractive index of the first lens element 110 is N1, the refractive index of the second lens element 120 is N2, and they satisfy the relation:

$$N2-N1=0.09.$$

In the first embodiment of the present optical lens system, the center thickness of the first lens element 110 is CT1, the center thickness of the second lens element 120 is CT2, and they satisfy the relation:

$$CT1/CT2=0.59.$$

In the first embodiment of the present optical lens system, the radius of curvature of the object-side surface 111 of the first lens element 110 is R1, the radius of curvature of the image-side surface 112 of the first lens element 110 is R2, and they satisfy the relation:

$$R1/R2=0.57.$$

In the first embodiment of the present optical lens system, the focal length of the miniaturized optical lens system is f, the radius of curvature of the object-side surface 121 of the second lens element 120 is R3, and they satisfy the relation:

$$R3/f=-1.01.$$

In the first embodiment of the present optical lens system, the focal length of the miniaturized optical lens system is f, the focal length of the second lens element 120 is f2, and they satisfy the relation:

$$f/f2=-0.004.$$

In the first embodiment of the present optical lens system, the distance from the image-side surface 122 of the second lens element 120 to the image plane 190 along the optical axis 150 is Bf, the center thickness of the second lens element 120 is CT2, and they satisfy the relation:

$$Bf/CT2=1.21.$$

In the first embodiment of the present optical lens system, the distance from the aperture stop 100 to the image plane 190 along the optical axis 150 is SL, the distance from the object-side surface 111 of the first lens element 110 to the image plane 190 along the optical axis 150 is TTL, and they satisfy the relation:

$$SL/TTL=0.94.$$

In the first embodiment of the present optical lens system, the distance from the object-side surface 111 of the first lens element 110 to the image plane 190 along the optical axis 150 is TTL, an electronic sensor (not shown) is provided on the image plane 190, half of the diagonal length of the electronic sensor's effective pixel region is ImgH, and they satisfy the relation:

$$TTL/ImgH=1.71.$$

The detailed optical data of the first embodiment is shown in table 1, and the aspheric surface data is shown in table 2, wherein the units of the radius of curvature, the thickness and the focal length are expressed in mm.

TABLE 1

(Embodiment 1)
f(focal length) = 1.84 mm, Fno = 2.45, HFOV (half of field of view) = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.130 | | | | |
| 2 | Lens 1 | 0.515050(ASP) | 0.386 | Plastic | 1.544 | 55.9 | 1.62 |
| 3 | | 0.910960(ASP) | 0.130 | | | | |
| 4 | | Plano | 0.108 | | | | |
| 5 | Lens 2 | −1.851840(ASP) | 0.649 | Plastic | 1.632 | 23.4 | −508.36 |
| 6 | | −2.115360(ASP) | 0.400 | | | | |
| 7 | IR-filter | Plano | 0.200 | Glass | 1.517 | 64.2 | |
| 8 | | Plano | 0.249 | | | | |
| 9 | Image | Plano | | | | | |

Note:
reference wavelength is: d-line 587.6 nm, and the effective radius of the surface # 4 is 0.31 mm.

TABLE 2

Aspheric Coefficients

| | Surface # | | | |
|---|---|---|---|---|
| | 2 | 3 | 5 | 6 |
| k = | 1.53602E−01 | 6.50219E+00 | 2.31273E+01 | 5.08130E+00 |
| A4 = | −1.60334E−01 | 3.33540E−01 | 9.02796E−03 | −3.24474E−01 |
| A6 = | 2.02042E+00 | −9.50396E+00 | −2.57243E+01 | 4.44899E+00 |

TABLE 2-continued

Aspheric Coefficients

| | Surface # | | | |
|---|---|---|---|---|
| | 2 | 3 | 5 | 6 |
| A8 = | 1.43785E+01 | 1.02997E+02 | 2.60214E+02 | −4.12745E+01 |
| A10 = | −4.17690E+02 | 1.80469E+01 | −8.19364E+02 | 1.84209E+02 |
| A12 = | 2.93865E+03 | −9.89554E+03 | −8.87704E+03 | −4.51311E+02 |
| A14 = | −7.06669E+03 | 5.02631E+04 | 5.18671E+04 | 5.73247E+02 |
| A16 = | 4.84967E+03 | −2.84781E+03 | −4.60415E+04 | −2.98581E+02 |

Figure 2A:
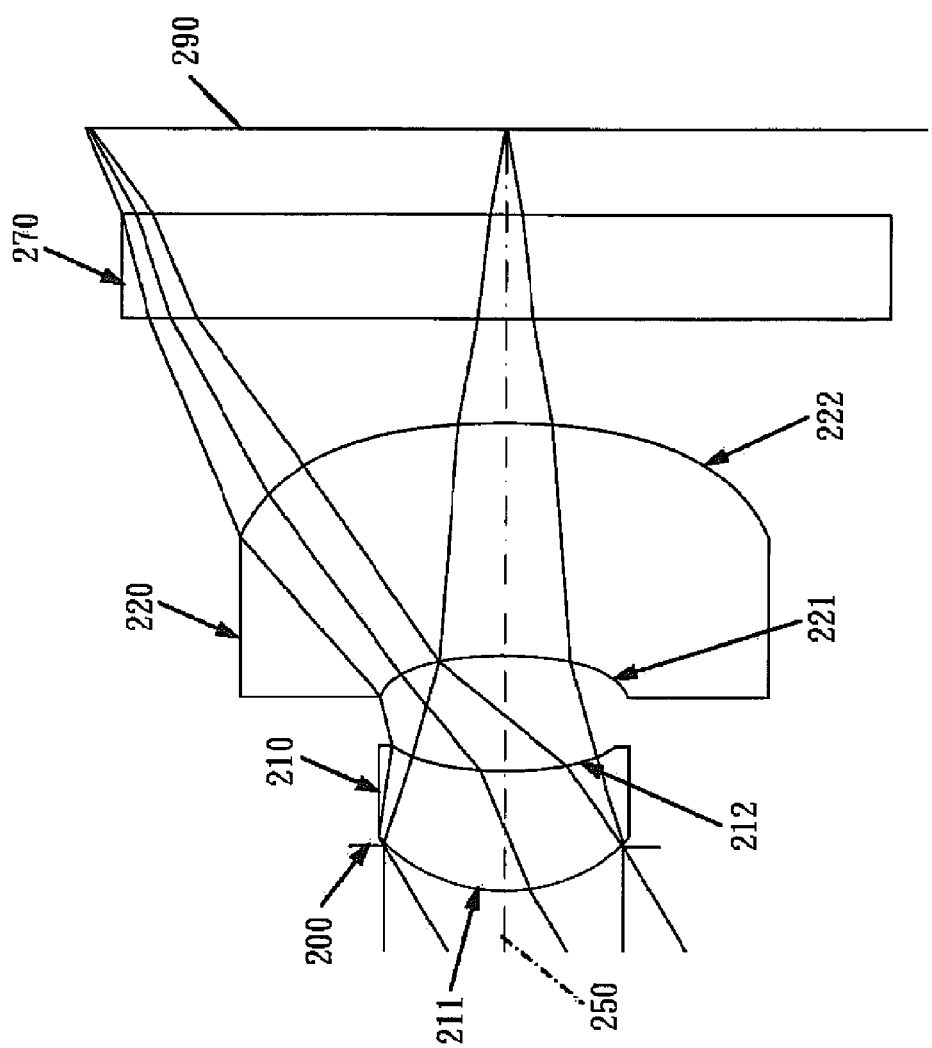
FIG. 2A shows an optical lens system in accordance with a second embodiment of the present invention.
Figure 2B:
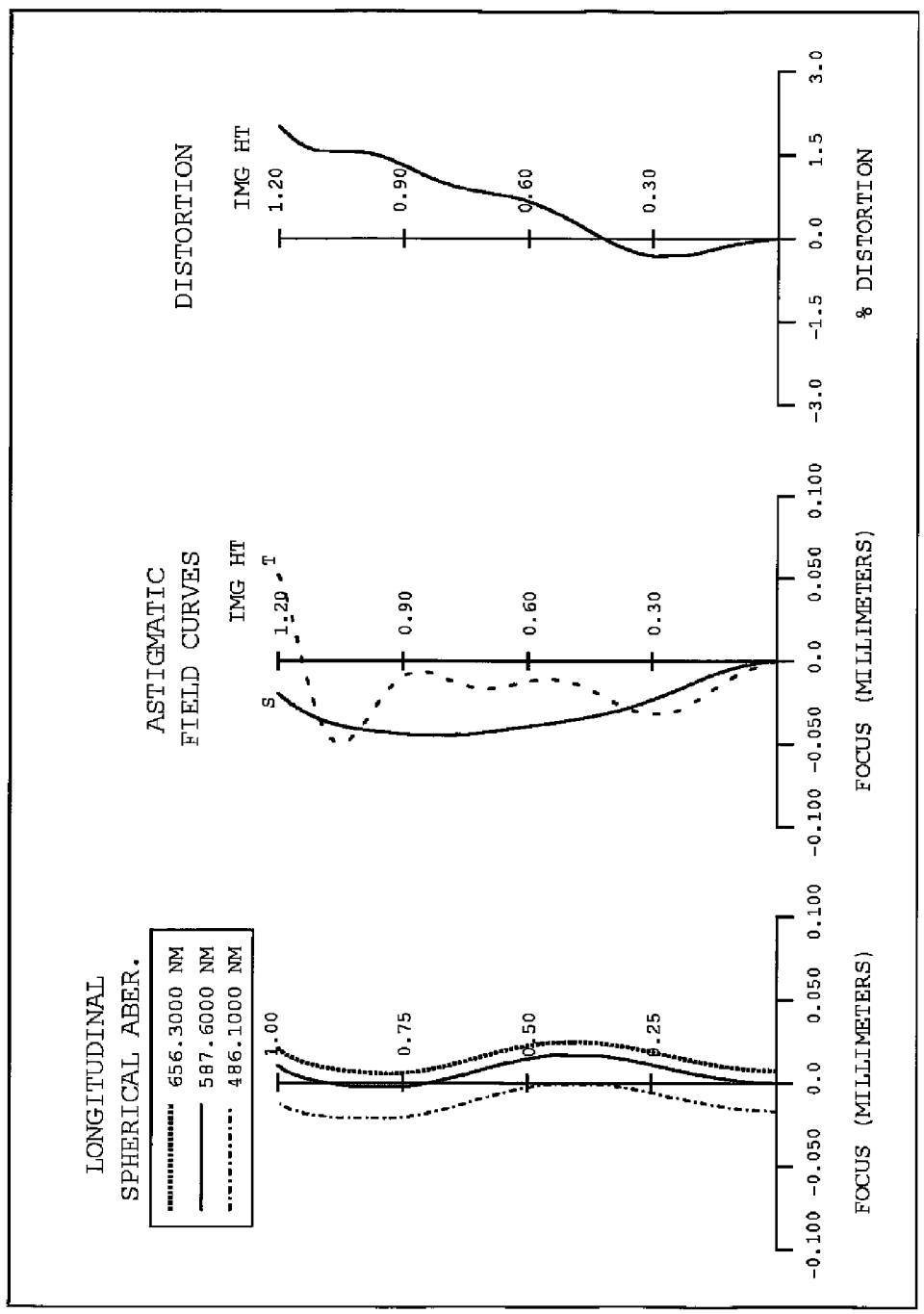
FIG. 2B shows the longitudinal spherical aberration curves, the astigmatic field curves, and the distortion curve of the second embodiment of the present invention.

Referring to FIG. 2A, which shows a miniaturized optical lens system in accordance with a second embodiment of the present invention, and FIG. 2B shows the longitudinal spherical aberration curves, the astigmatic field curves, and the distortion curve of the second embodiment of the present invention. The second embodiment of the present invention comprises, in order from the object side to the image side:

A plastic first lens element 210 with positive refractive power has a convex object-side surface 211 and a concave image-side surface 212, and the object-side surface 211 and the image-side surface 212 of the first lens element 210 are aspheric.

A plastic second lens element 220 with negative refractive power has a concave object-side surface 221 and a convex image-side surface 222, and the object-side surface 221 and the image-side surface 222 of the second lens element 220 are aspheric.

An aperture stop 200 is located between an object to be photographed (not shown) and the first lens element 210.

An IR cut filter 270 which is made of glass is located between the image-side surface 222 of the second lens element 220 and an image plane 290 and has no influence on the focal length of the miniaturized optical lens system.

The equation for the aspheric surface profiles of the second embodiment has the same form as that of the first embodiment.

In the second embodiment of the present optical lens system, the focal length of the miniaturized optical lens system is f, and it satisfies the relation:

$f=1.96$.

In the second embodiment of the present optical lens system, the f-number of the miniaturized optical lens system is Fno, and it satisfies the relation:

$Fno=2.85$.

In the second embodiment of the present optical lens system, half of the maximal field of view is HFOV, and it satisfies the relation:

$HFOV=31.0$.

In the second embodiment of the present optical lens system, the Abbe number of the first lens element 210 is V1, the Abbe number of the second lens element 220 is V2, and they satisfy the relation:

$|V1-V2|=32.1$.

In the second embodiment of the present optical lens system, the refractive index of the first lens element 210 is N1, the refractive index of the second lens element 220 is N2, and they satisfy the relation:

$N2-N1=0.09$.

In the second embodiment of the present optical lens system, the center thickness of the first lens element 210 is CT1, the center thickness of the second lens element 220 is CT2, and they satisfy the relation:

$CT1/CT2=0.51$.

In the second embodiment of the present optical lens system, the radius of curvature of the object-side surface 211 of the first lens element 210 is R1, the radius of curvature of the image-side surface 212 of the first lens element 210 is R2, and they satisfy the relation:

$R1/R2=0.48$.

In the second embodiment of the present optical lens system, the focal length of the miniaturized optical lens system is f, the radius of curvature of the object-side surface 221 of the second lens element 220 is R3, and they satisfy the relation:

$R3/f=-0.61$.

In the second embodiment of the present optical lens system, the focal length of the miniaturized optical lens system is f, the focal length of the second lens element 220 is f2, and they satisfy the relation:

$f/f2=-0.272$.

In the second embodiment of the present optical lens system, the distance from the image-side surface 222 of the second lens element 220 to the image plane 290 along the optical axis 250 is Bf, the center thickness of the second lens element 220 is CT2, and they satisfy the relation:

$Bf/CT2=1.11$.

In the second embodiment of the present optical lens system, the distance from the aperture stop 200 to the image plane 290 along the optical axis 250 is SL, the distance from the object-side surface 211 of the first lens element 210 to the image plane 290 along the optical axis 250 is TTL, and they satisfy the relation:

$SL/TTL=0.94$.

In the second embodiment of the present optical lens system, the distance from the object-side surface 211 of the first lens element 210 to the image plane 290 along the optical axis 250 is TTL, an electronic sensor (not shown) is provided on the image plane 290, half of the diagonal length of the electronic sensor's effective pixel region is ImgH, and they satisfy the relation:

$TTL/ImgH=1.75$.

The detailed optical data of the second embodiment is shown in table 3, and the aspheric surface data is shown in table 4, wherein the units of the radius of curvature, the thickness and the focal length are expressed in mm.

TABLE 3

(Embodiment 2)
f(focal length) = 1.96 mm, Fno = 2.85, HFOV (half of field of view) = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.127 | | | | |
| 2 | Lens 1 | 0.511290(ASP) | 0.344 | Plastic | 1.544 | 55.9 | 1.48 |
| 3 | | 1.066010(ASP) | 0.332 | | | | |
| 4 | Lens 2 | −1.189920(ASP) | 0.673 | Plastic | 1.634 | 23.8 | −7.20 |
| 5 | | −1.962620(ASP) | 0.300 | | | | |
| 6 | IR-filter | Plano | 0.300 | Glass | 1.517 | 64.2 | |
| 7 | | Plano | 0.246 | | | | |
| 8 | Image | Plano | | | | | |

Note:
reference wavelength is: d-line 587.6 nm.

TABLE 4

Aspheric Coefficients

| | Surface # | | | |
|---|---|---|---|---|
| | 2 | 3 | 4 | 5 |
| k = | −1.02842E−02 | 8.54454E+00 | 1.00000E+01 | 6.67736E−02 |
| A4 = | −4.95418E−02 | 4.80407E−01 | 2.00069E−01 | −4.87595E−01 |
| A6 = | 4.14473E+00 | −1.38709E+01 | −3.08483E+01 | 5.12086E+00 |
| A8 = | −9.25889E+00 | 1.62786E+02 | 3.24484E+02 | −4.54919E+01 |
| A10 = | −2.16113E+02 | −1.96302E+02 | −9.13241E+02 | 1.94474E+02 |
| A12 = | 2.63336E+03 | −9.37811E+03 | −1.00177E+04 | −4.49499E+02 |
| A14 = | −7.05992E+03 | 4.97092E+04 | 5.16904E+04 | 5.33268E+02 |
| A16 = | 1.72901E+03 | −4.01151E+03 | −4.69971E+04 | −2.57215E+02 |

Figure 3A:
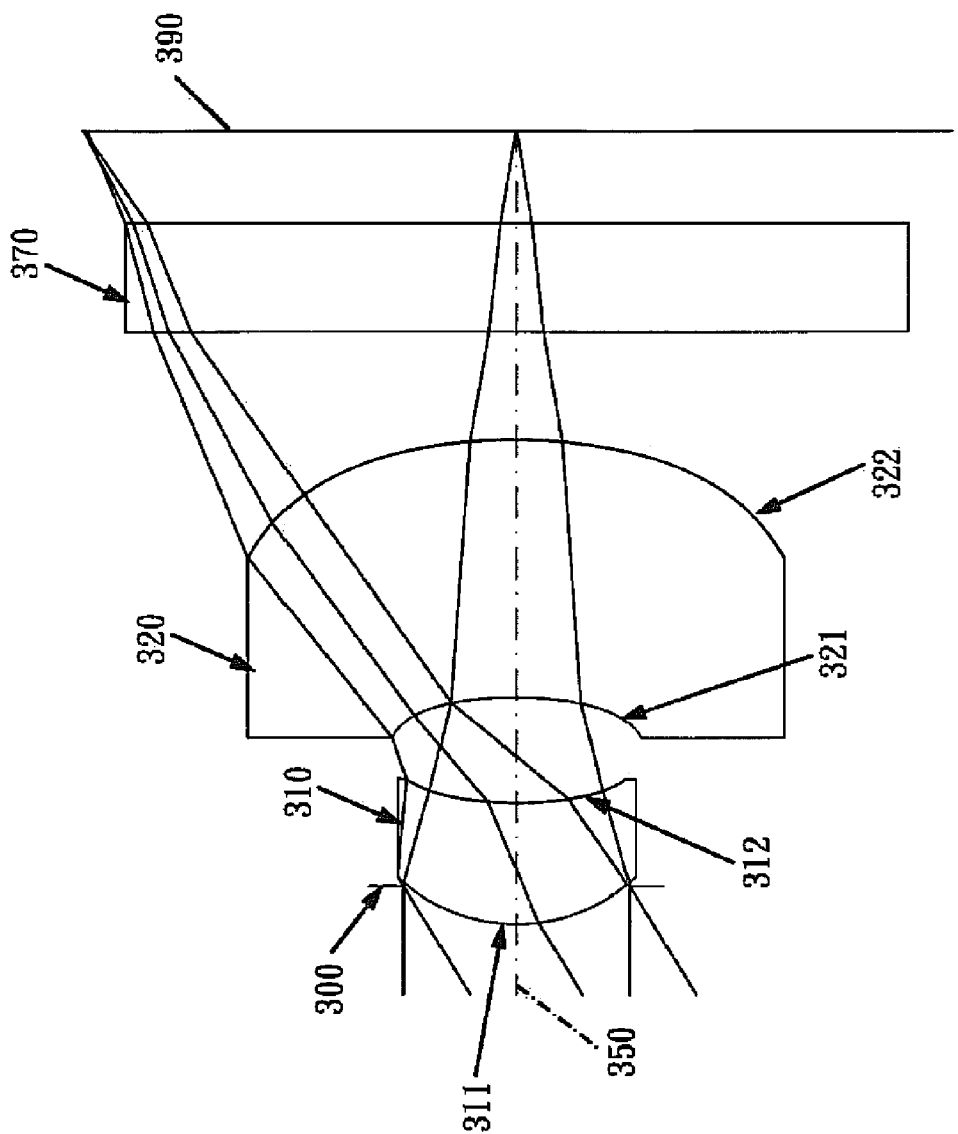
FIG. 3A shows an optical lens system in accordance with a third embodiment of the present invention.
Figure 3B:
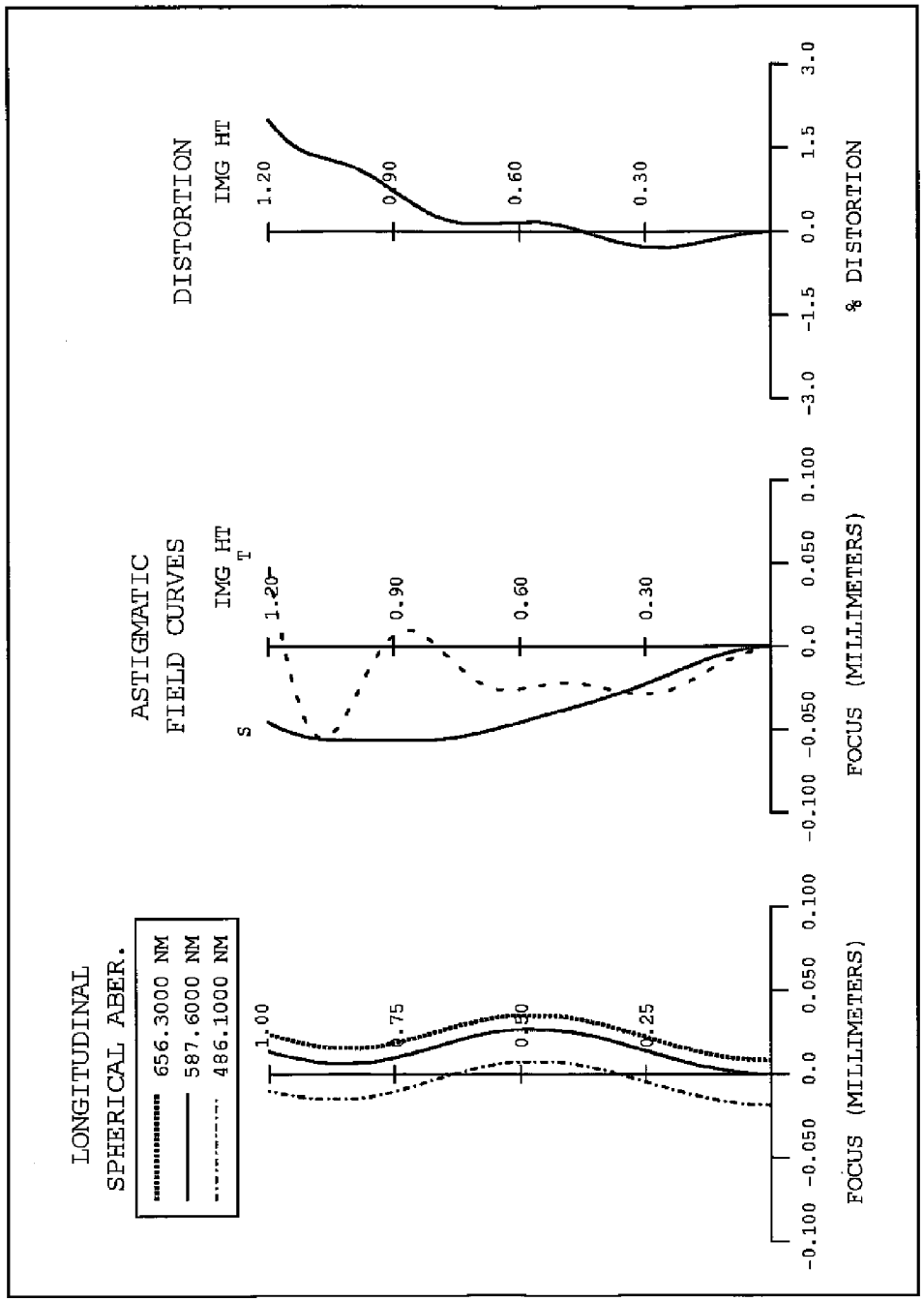
FIG. 3B shows the longitudinal spherical aberration curves, the astigmatic field curves, and the distortion curve of the third embodiment of the present invention.

Referring to FIG. 3A, which shows a miniaturized optical lens system in accordance with a third embodiment of the present invention, and FIG. 3B shows the longitudinal spherical aberration curves, the astigmatic field curves, and the distortion curve of the third embodiment of the present invention. The third embodiment of the present invention comprises, in order from the object side to the image side:

A plastic first lens element 310 with positive refractive power has a convex object-side surface 311 and a concave image-side surface 312, and the object-side surface 311 and the image-side surface 312 of the first lens element 310 are aspheric.

A plastic second lens element 320 with negative refractive power has a concave object-side surface 321 and a convex image-side surface 322, and the object-side surface 321 and the image-side surface 322 of the second lens element 320 are aspheric.

An aperture stop 300 is located between an object to be photographed (not shown) and the first lens element 310.

An IR cut filter 370 which is made of glass is located between the image-side surface 322 of the second lens element 320 and an image plane 390 and has no influence on the focal length of the miniaturized optical lens system.

The equation for the aspheric surface profiles of the third embodiment has the same form as that of the first embodiment.

In the third embodiment of the present optical lens system, the focal length of the miniaturized optical lens system is f, and it satisfies the relation:

$f=1.89$.

In the third embodiment of the present optical lens system, the f-number of the miniaturized optical lens system is Fno, and it satisfies the relation:

$Fno=3.00$.

In the third embodiment of the present optical lens system, half of the maximal field of view is HFOV, and it satisfies the relation:

$HFOV=31.9$.

In the third embodiment of the present optical lens system, the Abbe number of the first lens element 310 is V1, the Abbe number of the second lens element 320 is V2, and they satisfy the relation:

$|V1-V2|=25.6$.

In the third embodiment of the present optical lens system, the refractive index of the first lens element 310 is N1, the refractive index of the second lens element 320 is N2, and they satisfy the relation:

$N2-N1=0.05$.

In the third embodiment of the present optical lens system, the center thickness of the first lens element 310 is CT1, the center thickness of the second lens element 320 is CT2, and they satisfy the relation:

$CT1/CT2=0.47$.

In the third embodiment of the present optical lens system, the radius of curvature of the object-side surface 311 of the first lens element 310 is R1, the radius of curvature of the image-side surface 312 of the first lens element 310 is R2, and they satisfy the relation:

$R1/R2=0.48$.

In the third embodiment of the present optical lens system, the focal length of the miniaturized optical lens system is f, the radius of curvature of the object-side surface 321 of the second lens element 320 is R3, and they satisfy the relation:

$R3/f=-0.60$.

In the third embodiment of the present optical lens system, the focal length of the miniaturized optical lens system is f, the focal length of the second lens element 320 is f2, and they satisfy the relation:

$f/f2=-0.110$.

In the third embodiment of the present optical lens system, the distance from the image-side surface 322 of the second lens element 320 to the image plane 390 along the optical axis 350 is Bf, the center thickness of the second lens element 320 is CT2, and they satisfy the relation:

$Bf/CT2=1.05$.

In the third embodiment of the present optical lens system, the distance from the aperture stop 300 to the image plane 390 along the optical axis 350 is SL, the distance from the object-side surface 311 of the first lens element 310 to the image plane 390 along the optical axis 350 is TTL, and they satisfy the relation:

$SL/TTL=0.95$.

In the third embodiment of the present optical lens system, the distance from the object-side surface 311 of the first lens element 310 to the image plane 390 along the optical axis 350 is TTL, an electronic sensor (not shown) is provided on the image plane 390, half of the diagonal length of the electronic sensor's effective pixel region is ImgH, and they satisfy the relation:

$TTL/ImgH=1.75$.

The detailed optical data of the third embodiment is shown in table 5, and the aspheric surface data is shown in table 6, wherein the units of the radius of curvature, the thickness and the focal length are expressed in mm.

TABLE 5

(Embodiment 3)
f(focal length) = 1.89 mm, Fno = 3.00, HFOV (half of field of view) = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Apertutre Stop | Plano | −0.104 | | | | |
| 2 | Lens 1 | 0.497000(ASP) | 0.335 | Plastic | 1.530 | 55.8 | 1.48 |
| 3 | | 1.041050(ASP) | 0.292 | | | | |
| 4 | Lens 2 | −1.142930(ASP) | 0.717 | Plastic | 1.583 | 30.2 | −17.18 |
| 5 | | −1.588260(ASP) | 0.300 | | | | |
| 6 | IR-filter | Plano | 0.300 | Glass | 1.517 | 64.2 | |
| 7 | | Plano | 0.255 | | | | |
| 8 | Image | Plano | | | | | |

Note:
reference wavelength is: d-line 587.6 nm.

TABLE 6

| Aspheric Coefficients | | | | |
|---|---|---|---|---|
| | Surface # | | | |
| | 2 | 3 | 4 | 5 |
| k = | 2.13205E−02 | 9.01904E+00 | 9.55693E+00 | 8.68756E−01 |
| A4 = | −1.35579E−01 | 6.43032E−01 | 2.57182E−01 | −3.80804E−01 |
| A6 = | 5.83765E+00 | −1.93627E+01 | −3.57890E+01 | 4.57065E+00 |
| A8 = | −1.21610E+01 | 2.44550E+02 | 4.00370E+02 | −4.39616E+01 |
| A10 = | −2.46772E+02 | −6.44429E+02 | −1.37003E+03 | 1.94162E+02 |
| A12 = | 2.68401E+03 | −9.37903E+03 | −1.00493E+04 | −4.52091E+02 |
| A14 = | −5.72799E+03 | 4.97092E+04 | 5.16904E+03 | 5.32680E+02 |
| A16 = | 4.52619E+03 | −4.01151E+03 | −4.69971E+04 | −2.53281E+02 |

Figure 4A:
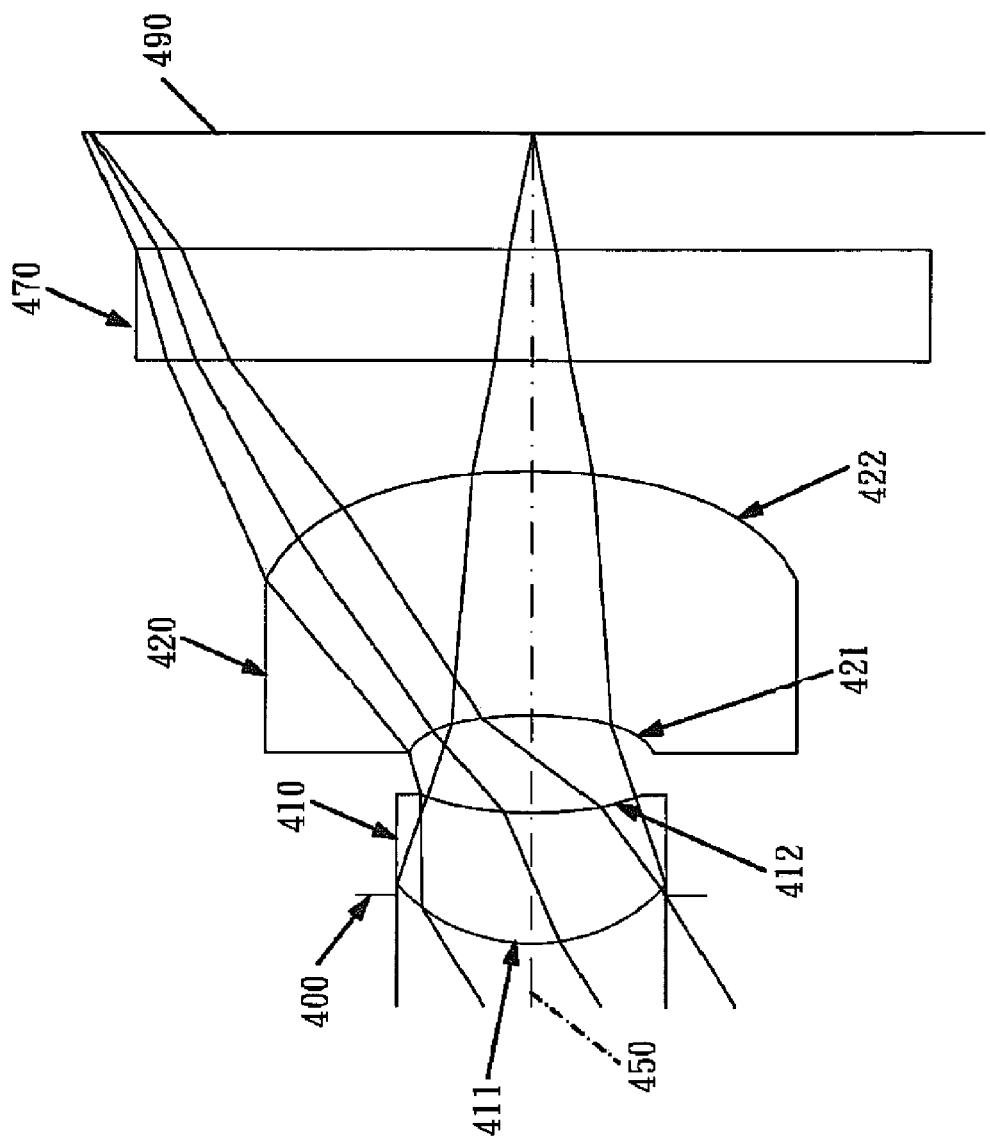
FIG. 4A shows an optical lens system in accordance with a fourth embodiment of the present invention.
Figure 4B:
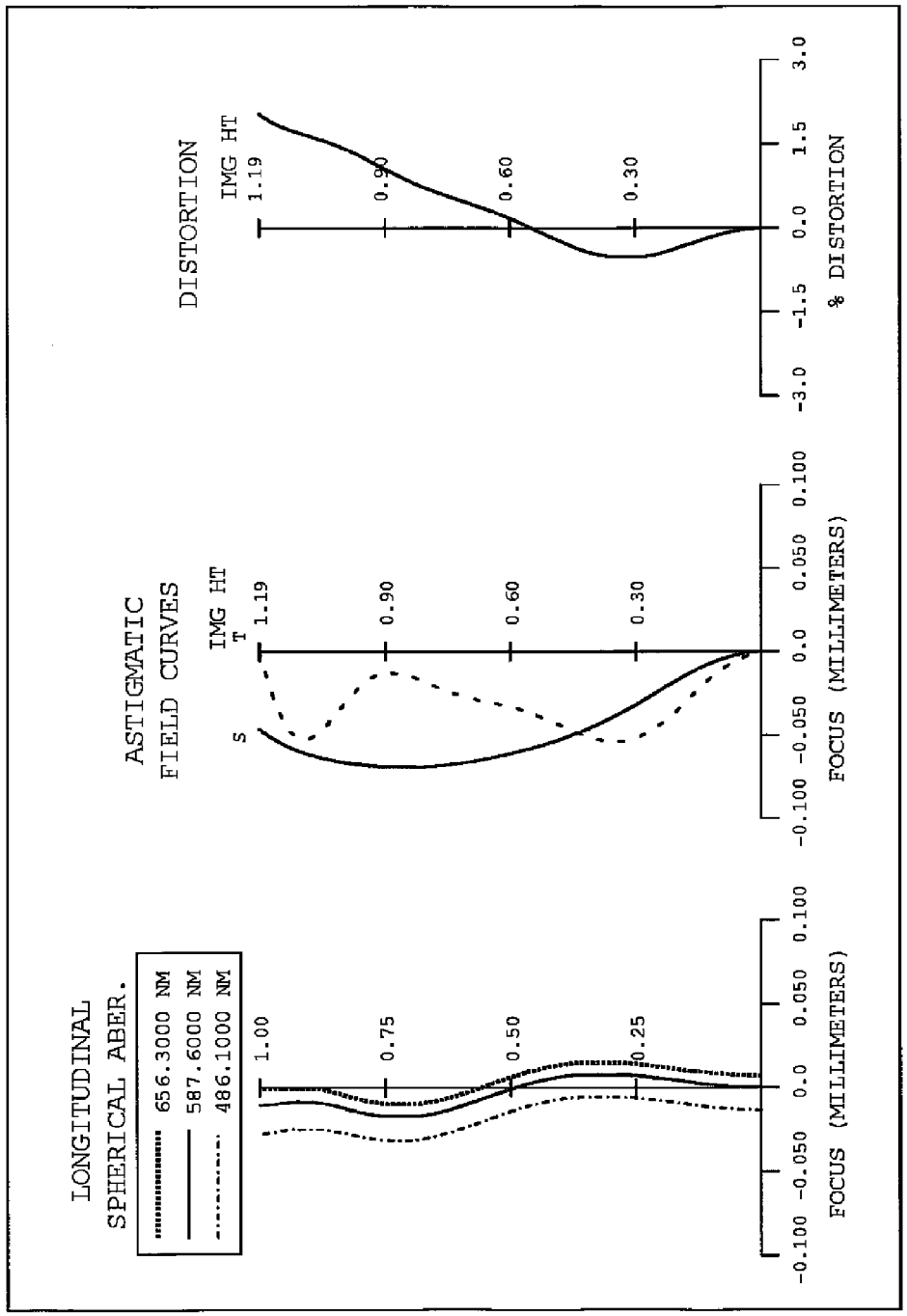
FIG. 4B shows the longitudinal spherical aberration curves, the astigmatic field curves, and the distortion curve of the fourth embodiment of the present invention.

Referring to FIG. 4A, which shows a miniaturized optical lens system in accordance with a fourth embodiment of the present invention, and FIG. 4B shows the longitudinal spherical aberration curves, the astigmatic field curves, and the distortion curve of the fourth embodiment of the present invention. The fourth embodiment of the present invention comprises, in order from the object side to the image side:

A plastic first lens element 410 with positive refractive power has a convex object-side surface 411 and a concave image-side surface 412, and the object-side surface 411 and the image-side surface 412 of the first lens element 410 are aspheric.

A plastic second lens element 420 with negative refractive power has a concave object-side surface 421 and a convex image-side surface 422, and the object-side surface 421 and the image-side surface 422 of the second lens element 420 are aspheric.

An aperture stop 400 is located between an object to be photographed (not shown) and the first lens element 410.

An IR cut filter 470 which is made of glass is located between the image-side surface 422 of the second lens element 420 and an image plane 490 and has no influence on the focal length of the miniaturized optical lens system.

The equation for the aspheric surface profiles of the fourth embodiment has the same form as that of the first embodiment.

In the fourth embodiment of the present optical lens system, the focal length of the miniaturized optical lens system is f, and it satisfies the relation:

$f=1.89$.

In the fourth embodiment of the present optical lens system, the f-number of the miniaturized optical lens system is Fno, and it satisfies the relation:

$Fno=2.60$.

In the fourth embodiment of the present optical lens system, half of the maximal field of view is HFOV, and it satisfies the relation:

$HFOV=31.9$.

In the fourth embodiment of the present optical lens system, the Abbe number of the first lens element 410 is V1, the Abbe number of the second lens element 420 is V2, and they satisfy the relation:

$|V1-V2|=34.4$.

In the fourth embodiment of the present optical lens system, the refractive index of the first lens element 410 is N1, the refractive index of the second lens element 420 is N2, and they satisfy the relation:

$N2-N1=0.12$.

In the fourth embodiment of the present optical lens system, the center thickness of the first lens element 410 is CT1, the center thickness of the second lens element 420 is CT2, and they satisfy the relation:

$CT1/CT2=0.53$.

In the fourth embodiment of the present optical lens system, the radius of curvature of the object-side surface 411 of the first lens element 410 is R1, the radius of curvature of the image-side surface 412 of the first lens element 410 is R2, and they satisfy the relation:

$R1/R2=0.45$.

In the fourth embodiment of the present optical lens system, the focal length of the miniaturized optical lens system is f, the radius of curvature of the object-side surface 421 of the second lens element 420 is R3, and they satisfy the relation:

$R3/f=-0.59$.

In the fourth embodiment of the present optical lens system, the focal length of the miniaturized optical lens system is f, the focal length of the second lens element 420 is f2, and they satisfy the relation:

$f/f2=-0.167$.

In the fourth embodiment of the present optical lens system, the distance from the image-side surface 422 of the second lens element 420 to the image plane 490 along the optical axis 450 is Bf, the center thickness of the second lens element 420 is CT2, and they satisfy the relation:

$Bf/CT2=1.23$.

In the fourth embodiment of the present optical lens system, the distance from the aperture stop 400 to the image plane 490 along the optical axis 450 is SL, the distance from the object-side surface 411 of the first lens element 410 to the image plane 490 along the optical axis 450 is TTL, and they satisfy the relation:

$SL/TTL=0.94$.

In the fourth embodiment of the present optical lens system, the distance from the object-side surface 411 of the first lens element 410 to the image plane 490 along the optical axis 450 is TTL, an electronic sensor (not shown) is provided on the image plane 490, half of the diagonal length of the electronic sensor's effective pixel region is ImgH, and they satisfy the relation:

$TTL/ImgH=1.75$.

The detailed optical data of the fourth embodiment is shown in table 7, and the aspheric surface data is shown in table 8, wherein the units of the radius of curvature, the thickness and the focal length are expressed in mm.

TABLE 7

(Embodiment 4)
f(focal length) = 1.89 mm, Fno = 2.60, HFOV (half of field of view) = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.130 | | | | |
| 2 | Lens 1 | 0.508240(ASP) | 0.353 | Plastic | 1.530 | 55.8 | 1.45 |
| 3 | | 1.133700(ASP) | 0.119 | | | | |
| 4 | | Plano | 0.147 | | | | |
| 5 | Lens 2 | −1.112980(ASP) | 0.664 | Plastic | 1.650 | 21.4 | −11.33 |
| 6 | | −1.619320(ASP) | 0.300 | | | | |
| 7 | IR-filter | Plano | 0.300 | Glass | 1.517 | 64.2 | |

TABLE 7-continued (Embodiment 4)
f(focal length) = 1.89 mm, Fno = 2.60, HFOV (half of field of view) = 31.9 deg.

| Surface # | | Curvature Radius | Thickness | Material | Index | Abbe # | Focal length |
|---|---|---|---|---|---|---|---|
| 8 | | Plano | 0.316 | | | | |
| 9 | Image | Plano | | | | | |

Note:
reference wavelength is: d-line 587.6 nm, and the effective radius of the surface # 4 is 0.32 mm.

TABLE 8

Aspheric Coefficients

| | Surface # | | | |
|---|---|---|---|---|
| | 2 | 3 | 5 | 6 |
| k = | −3.24319E−02 | 9.13652E+00 | 1.00000E+01 | 8.14838E−01 |
| A4 = | −5.84482E−02 | 4.06160E−01 | 7.30045E−01 | −4.43182E−01 |
| A6 = | 4.22515E+00 | −1.62641E+01 | −4.30019E+01 | 5.03218E+00 |
| A8 = | −4.12576E+00 | 1.87714E+02 | 4.77943E+02 | −4.36090E+01 |
| A10 = | −2.63255E+02 | −5.27506E+02 | −1.76674E+03 | 1.88199E+02 |
| A12 = | 2.39826E+03 | −9.22449E+03 | −9.99965E+03 | −4.49782E+02 |
| A14 = | −5.50091E+03 | 5.02631E+04 | 5.18671E+04 | 5.59136E+02 |
| A16 = | 4.84968E+03 | −2.84780E+03 | −4.60415E+04 | −2.85783E+02 |

Figure 5A:
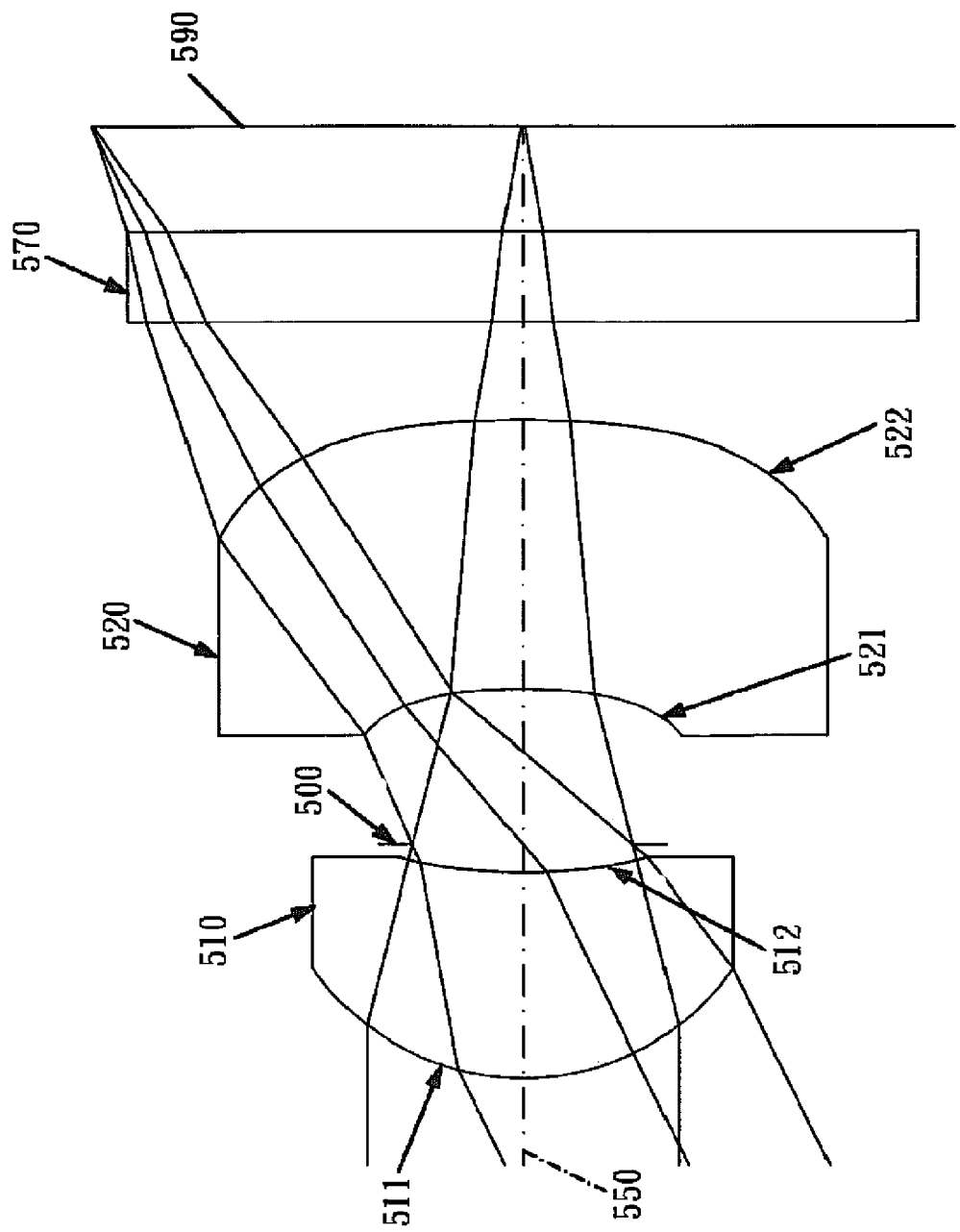
FIG. 5A shows an optical lens system in accordance with a fifth embodiment of the present invention.
Figure 5B:
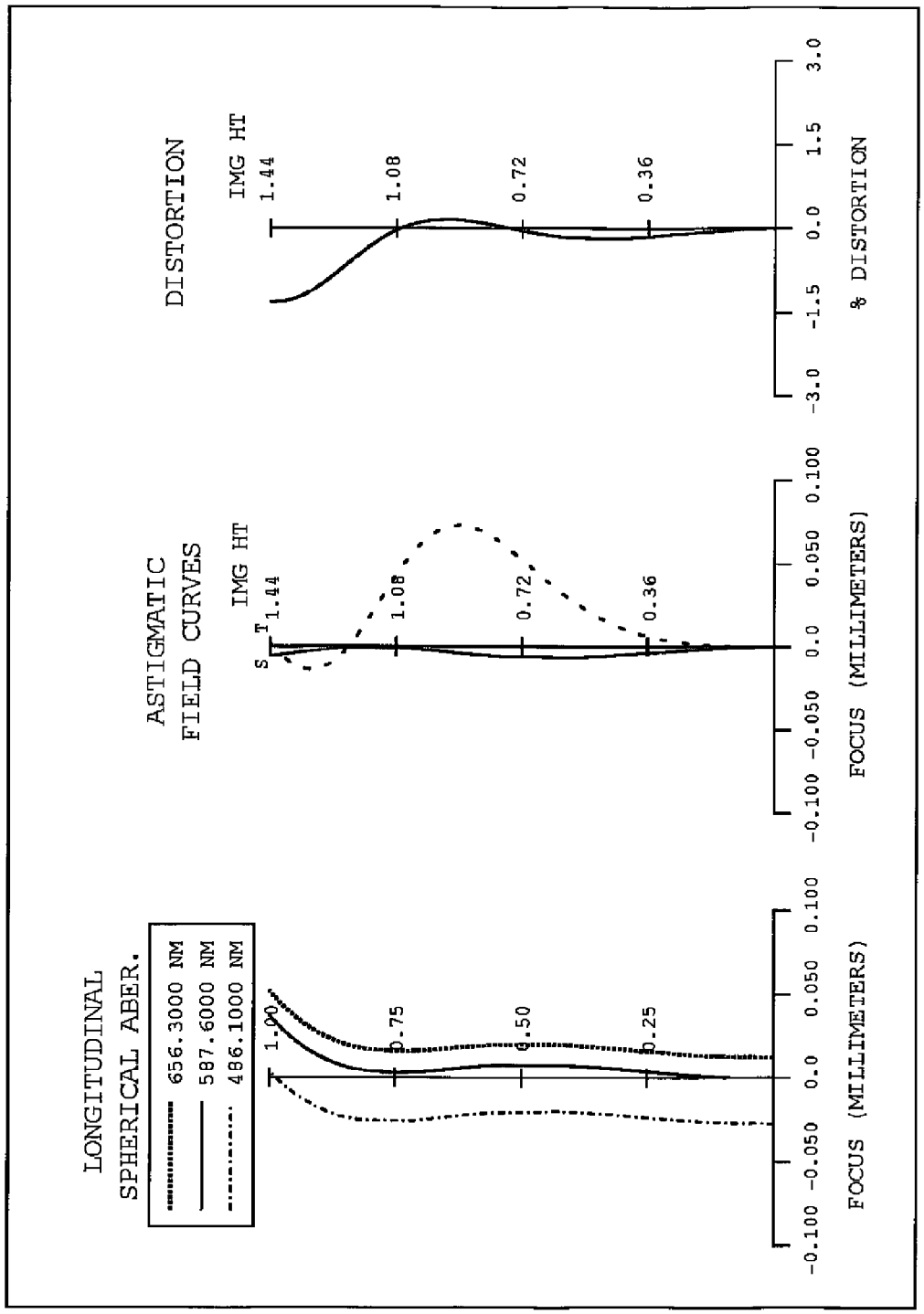
FIG. 5B shows the longitudinal spherical aberration curves, the astigmatic field curves, and the distortion curve of the fifth embodiment of the present invention.

Referring to FIG. 5A, which shows a miniaturized optical lens system in accordance with a fifth embodiment of the present invention, and FIG. 5B shows the longitudinal spherical aberration curves, the astigmatic field curves, and the distortion curve of the fifth embodiment of the present invention. The fifth embodiment of the present invention comprises, in order from the object side to the image side:

A plastic first lens element 510 with positive refractive power has a convex object-side surface 511 and a concave image-side surface 512, and the object-side surface 511 and the image-side surface 512 of the first lens element 510 are aspheric.

A plastic second lens element 520 with negative refractive power has a concave object-side surface 521 and a convex image-side surface 522, and the object-side surface 521 and the image-side surface 522 of the second lens element 520 are aspheric.

An aperture stop 500 is located between the first lens element 510 and the second lens element 520.

An IR cut filter 570 which is made of glass is located between the image-side surface 522 of the second lens element 520 and an image plane 590 and has no influence on the focal length of the miniaturized optical lens system.

The equation for the aspheric surface profiles of the fifth embodiment has the same form as that of the first embodiment.

In the fifth embodiment of the present optical lens system, the focal length of the miniaturized optical lens system is f, and it satisfies the relation:

$f=2.98$.

In the fifth embodiment of the present optical lens system, the f-number of the miniaturized optical lens system is Fno, and it satisfies the relation:

$Fno=2.85$.

In the fifth embodiment of the present optical lens system, half of the maximal field of view is HFOV, and it satisfies the relation:

$HFOV=26.1$.

In the fifth embodiment of the present optical lens system, the Abbe number of the first lens element 510 is V1, the Abbe number of the second lens element 520 is V2, and they satisfy the relation:

$|V1-V2|=33.1$.

In the fifth embodiment of the present optical lens system, the refractive index of the first lens element 510 is N1, the refractive index of the second lens element 520 is N2, and they satisfy the relation:

$N2-N1=0.09$.

In the fifth embodiment of the present optical lens system, the center thickness of the first lens element 510 is CT1, the center thickness of the second lens element 520 is CT2, and they satisfy the relation:

$CT1/CT2=0.76$.

In the fifth embodiment of the present optical lens system, the radius of curvature of the object-side surface 511 of the first lens element 510 is R1, the radius of curvature of the image-side surface 512 of the first lens element 510 is R2, and they satisfy the relation:

$R1/R2=0.44$.

In the fifth embodiment of the present optical lens system, the focal length of the miniaturized optical lens system is f, the radius of curvature of the object-side surface 521 of the second lens element 520 is R3, and they satisfy the relation:

$R3/f=-0.65$.

In the fifth embodiment of the present optical lens system, the focal length of the miniaturized optical lens system is f, the focal length of the second lens element 520 is f2, and they satisfy the relation:

$f/f2=-0.390$.

In the fifth embodiment of the present optical lens system, the distance from the image-side surface 522 of the second lens element 520 to the image plane 590 along the optical axis 550 is Bf, the center thickness of the second lens element 520 is CT2, and they satisfy the relation:

$$Bf/CT2=0.97.$$

In the fifth embodiment of the present optical lens system, the distance from the aperture stop 500 to the image plane 590 along the optical axis 550 is SL, the distance from the object-side surface 511 of the first lens element 510 to the image plane 590 along the optical axis 550 is TTL, and they satisfy the relation:

$$SL/TTL=0.75.$$

In the fifth embodiment of the present optical lens system, the distance from the object-side surface 511 of the first lens element 510 to the image plane 590 along the optical axis 550 is TTL, an electronic sensor (not shown) is provided on the image plane 590, half of the diagonal length of the electronic sensor's effective pixel region is ImgH, and they satisfy the relation:

$$TTL/ImgH=2.13.$$

The detailed optical data of the fifth embodiment is shown in table 9, and the aspheric surface data is shown in table 10, wherein the units of the radius of curvature, the thickness and the focal length are expressed in mm.

A plastic first lens element 610 with positive refractive power has a convex object-side surface 611 and a concave image-side surface 612, and the object-side surface 611 and the image-side surface 612 of the first lens element 610 are aspheric.

A plastic second lens element 620 with negative refractive power has a concave object-side surface 621 and a convex image-side surface 622, and the object-side surface 621 and the image-side surface 622 of the second lens element 620 are aspheric.

An aperture stop 600 is located between the first lens element 610 and the second lens element 620.

An IR cut filter 670 which is made of glass is located between the image-side surface 622 of the second lens element 620 and an image plane 690 and has no influence on the focal length of the miniaturized optical lens system.

The equation for the aspheric surface profiles of the sixth embodiment has the same form as that of the first embodiment.

In the sixth embodiment of the present optical lens system, the focal length of the miniaturized optical lens system is f, and it satisfies the relation:

$$f=2.97.$$

TABLE 9

(Embodiment 5)
f(focal length) = 2.98 mm, Fno = 2.85, HFOV (half of field of view) = 26.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.85548(ASP) | 0.684 | Plastic | 1.543 | 56.5 | 2.30 |
| 2 | | 1.95494(ASP) | 0.093 | | | | |
| 3 | Aperture Stop | Plano | 0.520 | | | | |
| 4 | Lens 2 | −1.93634(ASP) | 0.900 | Plastic | 1.632 | 23.4 | −7.64 |
| 5 | | −3.81480(ASP) | 0.330 | | | | |
| 6 | IR-filter | Plano | 0.300 | Glass | 1.517 | 64.2 | |
| 7 | | Plano | 0.347 | | | | |
| 8 | Image | Plano | | | | | |

Note:
reference wavelength is: d-line 587.6 nm.

TABLE 10

Aspheric Coefficients

| | Surface # | | | |
|---|---|---|---|---|
| | 1 | 2 | 4 | 5 |
| k = | −1.22685E+00 | −3.55759E+01 | −9.60858E+00 | −1.58493E+01 |
| A4 = | 1.95825E−01 | 6.47511E−01 | −6.45558E−01 | −2.45010E−01 |
| A6 = | 3.04279E−01 | −1.47200E+00 | −2.13476E−01 | 2.65305E−01 |
| A8 = | −1.90985E−02 | 6.43013E+00 | −1.62519E+01 | −5.02538E−01 |
| A10 = | −8.31666E−01 | −1.35214E+01 | 1.00677E+02 | 1.56351E−01 |
| A12 = | 2.16030E+00 | 2.57298E+01 | −2.27533E+02 | 2.37133E−01 |
| A14 = | | | | −1.73812E−01 |

Figure 6A:
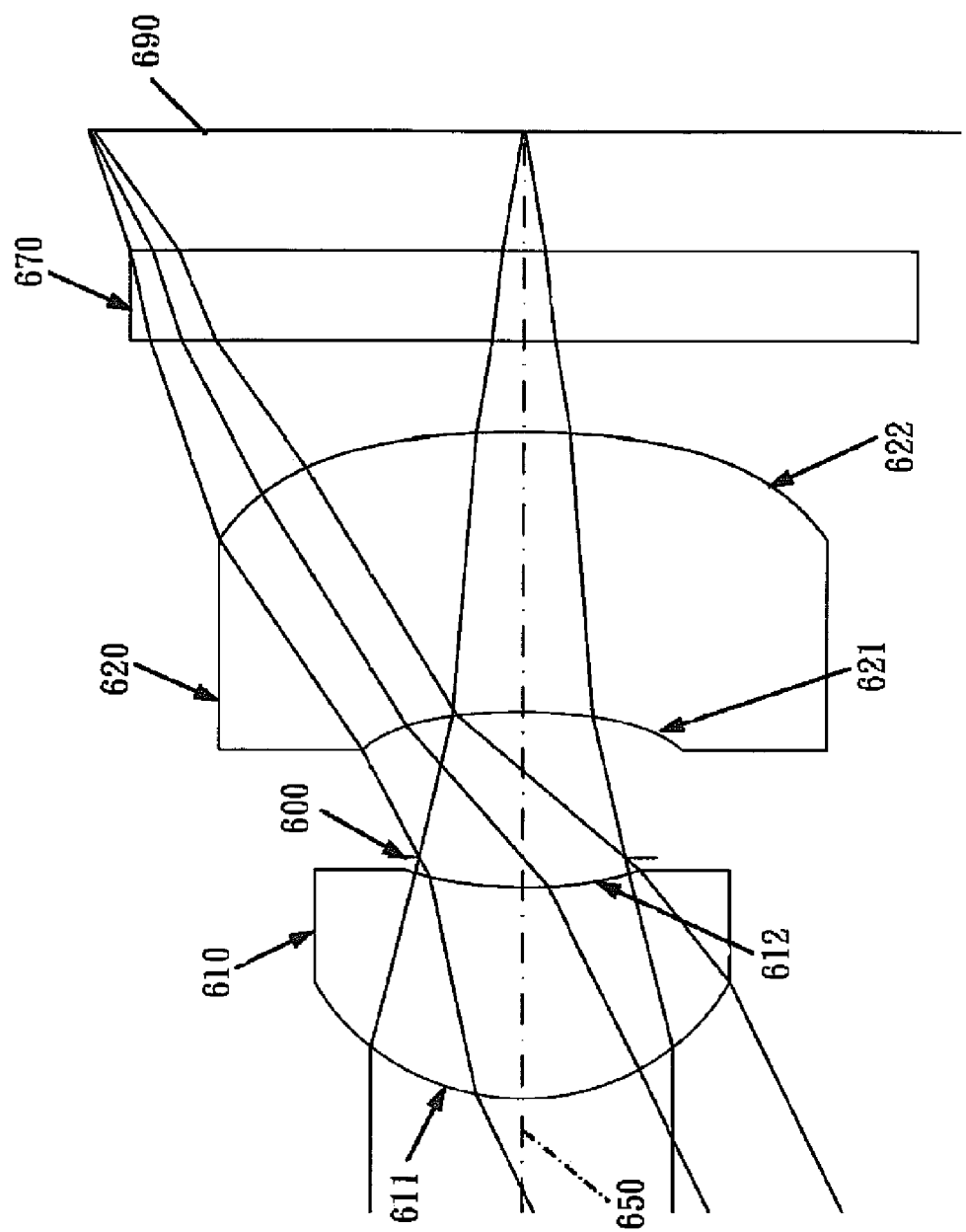
FIG. 6A shows an optical lens system in accordance with a sixth embodiment of the present invention.
Figure 6B:
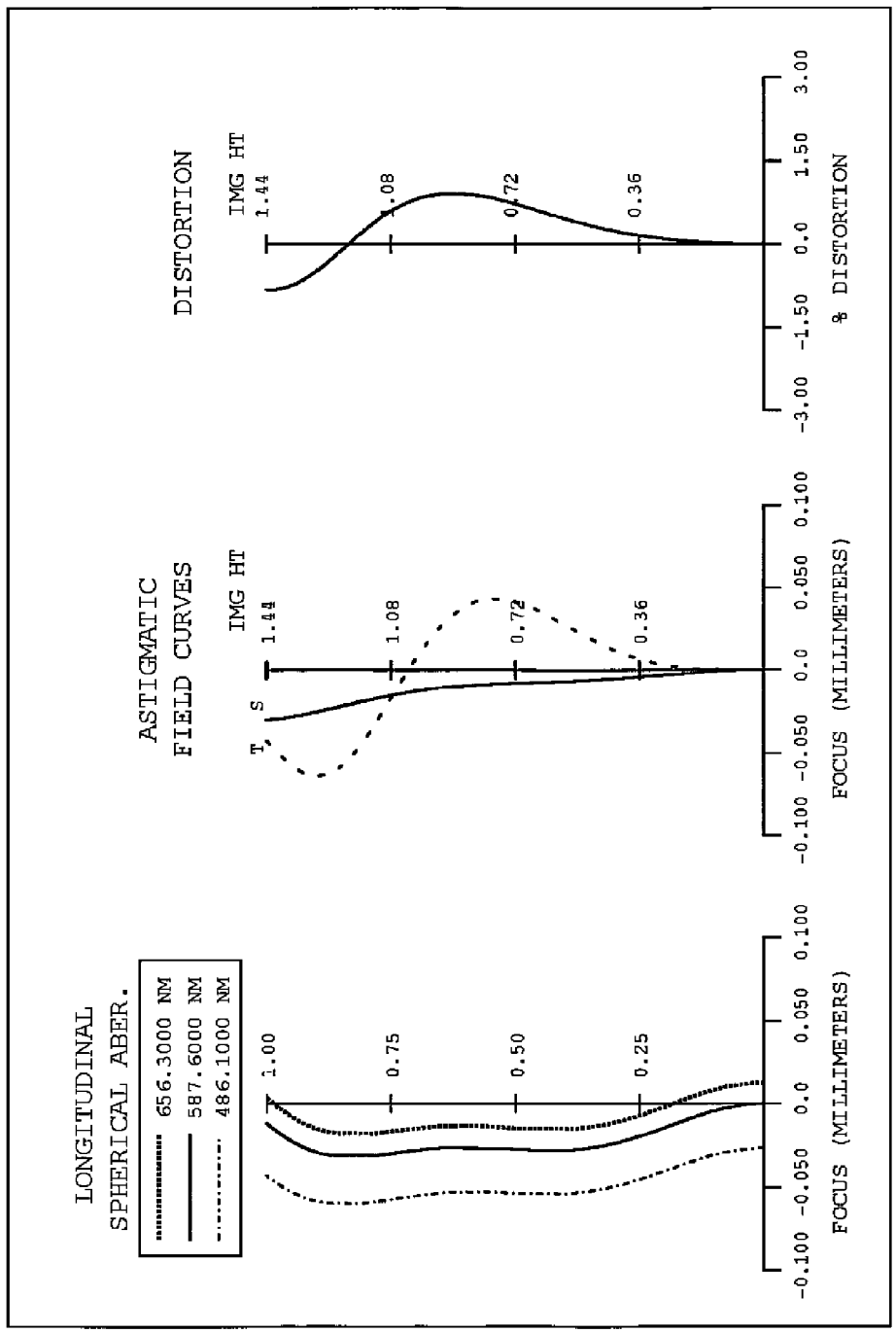
FIG. 6B shows the longitudinal spherical aberration curves, the astigmatic field curves, and the distortion curve of the sixth embodiment of the present invention.

Referring to FIG. 6A, which shows a miniaturized optical lens system in accordance with a sixth embodiment of the present invention, and FIG. 6B shows the longitudinal spherical aberration curves, the astigmatic field curves, and the distortion curve of the sixth embodiment of the present invention. The sixth embodiment of the present invention comprises, in order from the object side to the image side:

In the sixth embodiment of the present optical lens system, half of the maximal field of view is HFOV, and it satisfies the relation:

$$HFOV=26.0.$$

In the sixth embodiment of the present optical lens system, the Abbe number of the first lens element 610 is V1, the Abbe number of the second lens element 620 is V2, and they satisfy the relation:

$$|V1-V2|=35.1.$$

In the sixth embodiment of the present optical lens system, the refractive index of the first lens element 610 is N1, the refractive index of the second lens element 620 is N2, and they satisfy the relation:

$$N2-N1=0.11.$$

In the sixth embodiment of the present optical lens system, the center thickness of the first lens element 610 is CT1, the center thickness of the second lens element 620 is CT2, and they satisfy the relation:

$$CT1/CT2=0.75.$$

In the sixth embodiment of the present optical lens system, the radius of curvature of the object-side surface 611 of the first lens element 610 is R1, the radius of curvature of the image-side surface 612 of the first lens element 610 is R2, and they satisfy the relation:

$$R1/R2=0.53.$$

In the sixth embodiment of the present optical lens system, the focal length of the miniaturized optical lens system is f, the radius of curvature of the object-side surface 621 of the second lens element 620 is R3, and they satisfy the relation:

$$R3/f=-0.69.$$

In the sixth embodiment of the present optical lens system, the focal length of the miniaturized optical lens system is f, the focal length of the second lens element 620 is f2, and they satisfy the relation:

$$f/f2=-0.225.$$

In the sixth embodiment of the present optical lens system, the distance from the image-side surface 622 of the second lens element 620 to the image plane 690 along the optical axis 650 is Bf, the center thickness of the second lens element 620 is CT2, and they satisfy the relation:

$$Bf/CT2=0.96.$$

In the sixth embodiment of the present optical lens system, the distance from the aperture stop 600 to the image plane 690 along the optical axis 650 is SL, the distance from the object-side surface 611 of the first lens element 610 to the image plane 690 along the optical axis 650 is TTL, and they satisfy the relation:

$$SL/TTL=0.74.$$

In the sixth embodiment of the present optical lens system, the distance from the object-side surface 611 of the first lens element 610 to the image plane 690 along the optical axis 650 is TTL, an electronic sensor (not shown) is provided on the image plane 690, half of the diagonal length of the electronic sensor's effective pixel region is ImgH, and they satisfy the relation:

$$TTL/ImgH=2.16.$$

The detailed optical data of the sixth embodiment is shown in table 11, and the aspheric surface data is shown in table 12, wherein the units of the radius of curvature, the thickness and the focal length are expressed in mm.

TABLE 11

(Embodiment 6)
f(focal length) = 2.97 mm, Fno = 3.00, HFOV (half of field of view) = 26.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.82172(ASP) | 0.697 | Plastic | 1.543 | 56.5 | 2.41 |
| 2 | | 1.54768(ASP) | 0.099 | | | | |
| 3 | Aperture Stop | Plano | 0.483 | | | | |
| 4 | Lens 2 | −2.05023(ASP) | 0.930 | Plastic | 1.650 | 21.4 | −13.20 |
| 5 | | −3.17590(ASP) | 0.300 | | | | |
| 6 | IR-filter | Plano | 0.300 | Glass | 1.517 | 64.2 | |
| 7 | | Plano | 0.395 | | | | |
| 8 | Image | Plano | | | | | |

Note:
reference wavelength is: d-line 587.6 nm.

TABLE 12

Aspheric Coefficients

| | Surface # | | | |
|---|---|---|---|---|
| | 1 | 2 | 4 | 5 |
| k = | −9.74860E−01 | −5.50877E+01 | −5.44079E+01 | −9.18573E+00 |
| A4 = | 2.01757E−01 | 1.67251E+00 | −1.10883E+00 | −1.47982E−01 |
| A6 = | 6.77107E−02 | −7.58210E+00 | 3.17915E+00 | 9.29297E−02 |
| A8 = | 1.86153E+00 | 3.26998E+01 | −2.31643E+01 | −3.29757E−01 |
| A10 = | −5.67283E+00 | −4.06950E+01 | 8.33246E+01 | 1.80031E−01 |
| A12 = | 7.50152E+00 | −1.42867E+01 | −1.34726E+02 | 8.19105E−02 |
| A14 = | | | | −8.78244E−02 |

TABLE 13

|  | Embodiment 1 | Embodiment 2 | Embodiment 3 | Embodiment 4 | Embodiment 5 | Embodiment 6 |
| --- | --- | --- | --- | --- | --- | --- |
| f | 1.84 | 1.96 | 1.89 | 1.89 | 2.98 | 2.97 |
| Fno | 2.45 | 2.85 | 3.00 | 2.60 | 2.85 | 3.00 |
| HFOV | 33.0 | 31.0 | 31.9 | 31.9 | 26.1 | 26.0 |
| |V1 − V2| | 32.5 | 32.1 | 25.6 | 34.4 | 33.1 | 35.1 |
| N2 − N1 | 0.09 | 0.09 | 0.05 | 0.12 | 0.09 | 0.11 |
| CT1/CT2 | 0.59 | 0.51 | 0.47 | 0.53 | 0.76 | 0.75 |
| R1/R2 | 0.57 | 0.48 | 0.48 | 0.45 | 0.44 | 0.53 |
| R3/f | −1.01 | −0.61 | −0.60 | −0.59 | −0.65 | −0.69 |
| f/f2 | −0.004 | −0.272 | −0.110 | −0.167 | −0.390 | −0.225 |
| Bf/CT2 | 1.21 | 1.11 | 1.05 | 1.23 | 0.97 | 0.96 |
| SL/TTL | 0.94 | 0.94 | 0.95 | 0.94 | 0.75 | 0.74 |
| TTL/ImgH | 1.71 | 1.75 | 1.75 | 1.75 | 2.13 | 2.16 |

It is to be noted that the tables 1-12 show different data from the different embodiments, however, the data of the different embodiments is obtained from experiments. Therefore, any product of the same structure is deemed to be within the scope of the present invention even if it uses different data. Table 13 lists the relevant data for the various embodiments of the present invention.

In the present miniaturized optical lens system, the lens elements can be made of glass or plastic. If the lens elements are made of glass, there is more freedom in distributing the refractive power of the optical lens system. If the lens elements are made of plastic, the cost will be effectively reduced. Plastic lens elements can have aspheric surfaces, which allow more design parameter freedom (than spherical surfaces), so as to reduce the aberration and the number of the lens elements, as well as the total track length of the optical lens system.

In the present miniaturized optical lens system, if the object-side or the image-side surface of the lens elements is convex, the object-side or the image-side surface of the lens elements in proximity of the optical axis is convex. If the object-side or the image-side surface of the lens elements is concave, the object-side or the image-side surface of the lens elements in proximity of the optical axis is concave.

The present miniaturized optical lens system can have at least one stop to reduce flares, in order to further improve the image quality.

While we have shown and described various embodiments in accordance with the present invention, it should be clear to those skilled in the art that further embodiments may be made without departing from the scope of the present invention.

What is claimed is:

1. A miniaturized optical lens system comprising, in order from an object side to an image side:

a first lens element with positive refractive power having a convex object-side surface and a concave image-side surface, at least one of the object-side and the image-side surfaces of the first lens element being aspheric;

a second lens element with negative refractive power having a concave object-side surface and a convex image-side surface, at least one of the object-side and the image-side surfaces of the second lens element being aspheric;

wherein there are two lens elements with refractive power and an aperture stop in the miniaturized optical lens system; wherein an Abbe number of the first lens element is V1, an Abbe number of the second lens element is V2, a focal length of the miniaturized optical lens system is f, a focal length of the second lens element is f2, a radius of curvature of the object-side surface of the second lens element is R3, a distance from the aperture stop to an image plane along an optical axis is SL, a distance from the object-side surface of the first lens element to the image plane along the optical axis is TTL, and they satisfy the relations:

$15 < |V1 - V2| < 48;$ $-0.43 < f/f2 < 0;$ $-1.20 < R3/f < -0.50;$ $0.9 < SL/TTL < 1.1.$

2. The miniaturized optical lens system as claimed in claim 1, wherein the first lens element and the second lens element are made of plastic material, the object-side surface and the image-side surface of the first lens element are aspheric, and the object-side surface and the image-side surface of the second lens element are aspheric.

3. The miniaturized optical lens system as claimed in claim 2, wherein a radius of curvature of the object-side surface of the first lens element is R1, a radius of curvature of the image-side surface of the first lens element is R2, and they satisfy the relation:

$0 < R1/R2 < 0.8.$

4. The miniaturized optical lens system as claimed in claim 3, wherein the Abbe number of the first lens element is V1, the Abbe number of the second lens element is V2, and they satisfy the relation:

$23 < |V1 - V2| < 45.$

5. The miniaturized optical lens system as claimed in claim 4, wherein the Abbe number of the first lens element is V1, the Abbe number of the second lens element is V2, and they satisfy the relation:

$30 < |V1 - V2| < 42.$

6. The miniaturized optical lens system as claimed in claim 3, wherein the focal length of the miniaturized optical lens system is f, the focal length of the second lens element is f2, and they satisfy the relation:

$-0.27 < f/f2 < 0.$

7. The miniaturized optical lens system as claimed in claim 3, wherein a center thickness of the first lens element is CT1, a center thickness of the second lens element is CT2, and they satisfy the relation:

$0.25 < CT1/CT2 < 0.95.$

8. The miniaturized optical lens system as claimed in claim 7, wherein the center thickness of the first lens element is CT1, the center thickness of the second lens element is CT2, and they satisfy the relation:

$0.40 < CT1/CT2 < 0.76.$

9. The miniaturized optical lens system as claimed in claim 3, wherein a refractive index of the first lens element is N1, a refractive index of the second lens element is N2, and they satisfy the relation:

$0.04<N2-N1<0.18$.

10. The miniaturized optical lens system as claimed in claim 3, wherein a distance from the image-side surface of the second lens element to the image plane along the optical axis is Bf, a center thickness of the second lens element is CT2, and they satisfy the relation:

$0.95<Bf/CT2<1.65$.

11. The miniaturized optical lens system as claimed in claim 3, wherein the radius of curvature of the object-side surface of the first lens element is R1, the radius of curvature of the image-side surface of the first lens element is R2, and they satisfy the relation:

$0.40<R1/R2<0.60$.

12. The miniaturized optical lens system as claimed in claim 3, wherein the distance from the object-side surface of the first lens element to the image plane along the optical axis is TTL, an electronic sensor is provided on the image plane, half of a diagonal length of the electronic sensor's effective pixel region is ImgH, and they satisfy the relation:

$TTL/ImgH<1.95$.

13. A miniaturized optical lens system comprising, in order from an object side to an image side:
- a plastic first lens element with positive refractive power having a convex object-side surface and a concave image-side surface, the object-side and the image-side surfaces of the first lens element being aspheric;
- a plastic second lens element with negative refractive power having a concave object-side surface and a convex image-side surface, the object-side and the image-side surfaces of the second lens element being aspheric;
- wherein there are two lens elements with refractive power; wherein an Abbe number of the first lens element is V1, an Abbe number of the second lens element is V2, a focal length of the miniaturized optical lens system is f, a focal length of the second lens element is f2, a refractive index of the first lens element is N1, a refractive index of the second lens element is N2, a distance from the image-side surface of the second lens element to an image plane along an optical axis is Bf, a center thickness of the second lens element is CT2, a radius of curvature of the object-side surface of the second lens element is R3, and they satisfy the relations:

$15<|V1-V2|<48$;

$-0.43<f/f2<0$;

$N2>N1$;

$0.4<Bf/CT2<2.0$;

$-1.20<R3/f<-0.50$.

14. The miniaturized optical lens system as claimed in claim 13, wherein the refractive index of the first lens element is N1, the refractive index of the second lens element is N2, and they satisfy the relation:

$0.04<N2-N1<0.18$.

15. The miniaturized optical lens system as claimed in claim 13, wherein the distance from the image-side surface of the second lens element to the image plane along the optical axis is Bf, the center thickness of the second lens element is CT2, and they satisfy the relation:

$0.95<Bf/CT2<1.65$.

16. The miniaturized optical lens system as claimed in claim 15, wherein the miniaturized optical lens system is further provided with an aperture stop, a distance from the aperture stop to the image plane along the optical axis is SL, a distance from the object-side surface of the first lens element to the image plane along the optical axis is TTL, and they satisfy the relation:

$0.9<SL/TTL<1.1$.

17. The miniaturized optical lens system as claimed in claim 16, wherein the Abbe number of the first lens element is V1, the Abbe number of the second lens element is V2, and they satisfy the relation:

$30<|V1-V2|<42$.

18. The miniaturized optical lens system as claimed in claim 15, wherein the focal length of the miniaturized optical lens system is f, the focal length of the second lens element is f2, and they satisfy the relation:

$-0.27<f/f2<0$.

19. The miniaturized optical lens system as claimed in claim 15, wherein the center thickness of the first lens element is CT1, the center thickness of the second lens element is CT2, and they satisfy the relation:

$0.40<CT1/CT2<0.76$.

20. The miniaturized optical lens system as claimed in claim 15, wherein a radius of curvature of the object-side surface of the first lens element is R1, a radius of curvature of the image-side surface of the first lens element is R2, and they satisfy the relation:

$0.40<R1/R2<0.60$

* * * * *